June 29, 1954    C. F. BLOEDOW    2,682,322
THREAD COUPLING
Filed Dec. 22, 1950
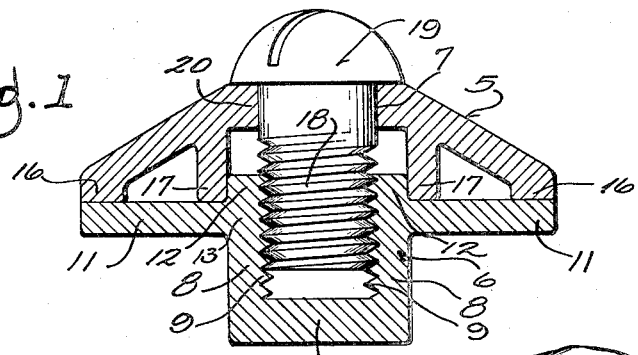
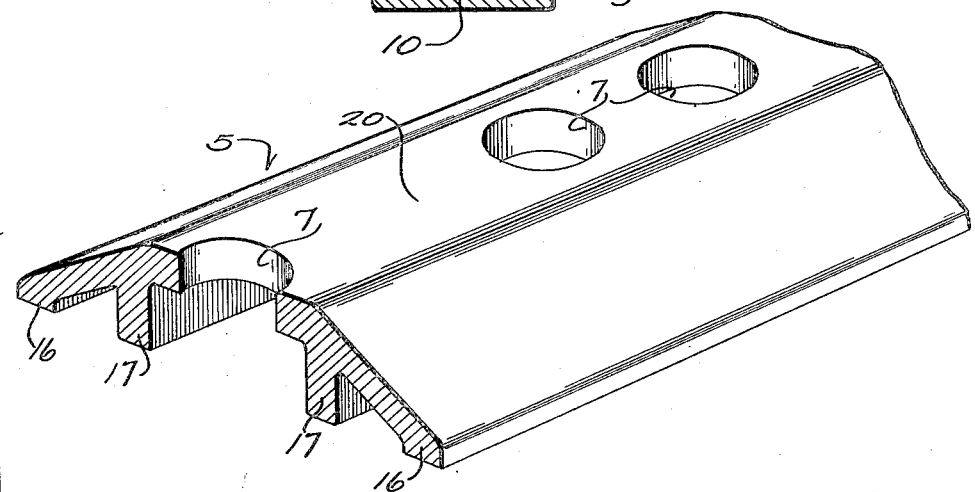
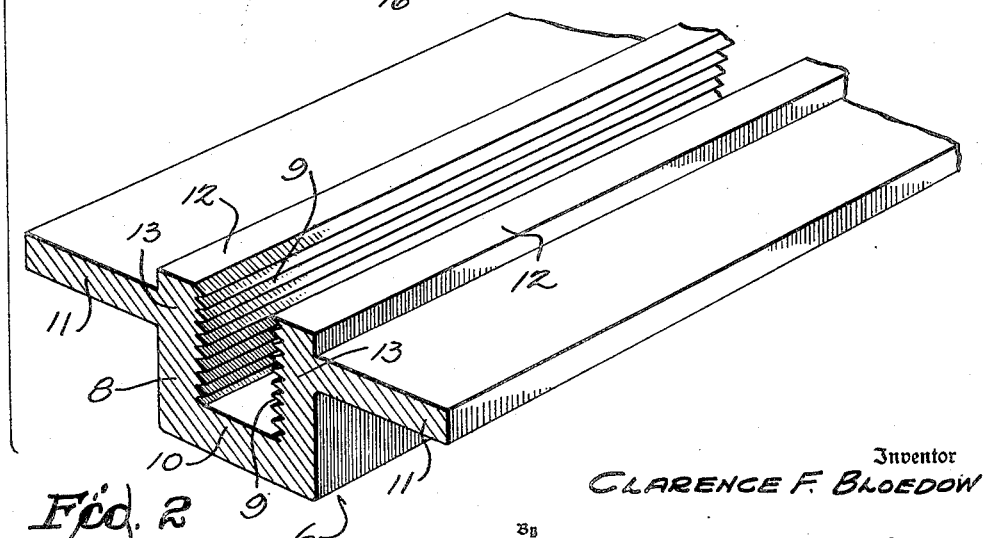
Inventor
CLARENCE F. BLOEDOW
By
Wheeler, Wheeler & Wheeler
Attorneys Patented June 29, 1954

2,682,322

UNITED STATES PATENT OFFICE 2,682,322

THREAD COUPLING

Clarence F. Bloedow, Milwaukee, Wis.

Application December 22, 1950, Serial No. 202,247

6 Claims. (Cl. 189—36)

This invention relates to improvements in thread couplings, and more particularly to an extruded thread coupling structure.

The primary object of the invention is to provide for channel-shaped members which may be bolted together without regard to the exact longitudinal alignment of one member with the other.

In this connection, it is an object of the invention to provide a channel member which comprises a parallel thread structure integral therewith, and along any point of which the threaded portion of a bolt or like fastener may be engaged. By reason of this structure, a threaded bolt may be interconnected with the member at any point along its length. Accordingly, the necessity for aligning bolt holes in one of said members with tapped holes in the other of said members is eliminated. A bolt passed through a bolt hole of one channel will be in automatic alignment with a complementary threaded portion of the other channel.

A particular object of the invention is to provide this threaded structure by the process of extrusion whereby the entire channel having the spaced parallel threads may be shaped in one extruding operation.

Other objects and advantages of the invention will be more apparent to one skilled in the art upon an examination of the following disclosure.

In the drawings:

Fig. 1 is a transverse cross section through mated channels embodying the invention, a coupling bolt being shown in elevation.

Fig. 2 is a perspective view in spaced apart relation of channel members embodying the present invention.

In the construction of window casings and frames, show windows and the like, the various frame elements may be preformed and assembled at the factory or on the job. For this purpose extruded shapes may be fabricated and thereafter coupled to construct the desired frame structure.

As best shown in Fig. 2, channel-shaped members indicated generally as 5 and 6, and which are desirably of extrudable metal such as aluminum, may be mated and coupled as is best shown in Fig. 1. The particular form of the shapes is variable depending on the purpose for which they are to be used.

Channel member 5 is desirably provided with longitudinally spaced bolt apertures 7, and channel member 6 is provided with spaced parallel walls 8 which are provided on their facing surfaces with spaced parallel rectilinear threads 9. The connecting web of channel 6 is indicated by the reference character 10. Channel-shaped member 6 may also comprise out-flanges or wings 11 and ribs 12 which constitute extensions of the walls 8 beyond the junction 13 of the walls 8 and the wings 11.

In the preferred embodiment of the invention channel member 6 is an extruded shape wherein the walls 8, web 10, wings 11, ribs 12, and threads 9 are formed in a single die by the process of extrusion so that upon issuance from the die, the channel is in substantially finished condition.

Channel member 5 is also desirably an extruded shape and is formed with paired outboard positioning flanges or abutments 16, comprising flanged side margins of the channel, and with paired inboard positioning flanges or abutment 17 comprising spaced walls which embrace the ribs 12 of channel 6 when the respective channels are mated. The ends of the abutments 16 and 17 are co-planar whereby to define the mated position of channel 5 against the wings 11 of channel 6. By reason of the embrace of the ribs 12 by the walls 17 of channel 5, the thread structure 9 is braced against spreading when the threaded shank 18 of bolt 19 is engaged through one of apertures 7 in the channel 5 and with the threads 9 of channel 6. Bolt 19 is desirably of the type in which each thread on shank 18 is of the same diameter to insure maximum threaded connection with the threads 9 of walls 8, and to insure against wedging apart the walls 8.

The web 20 of channel member 5 is of substantial thickness in the vicinity of the bolt apertures 7 to guide the bolt shank 18 on its axis and restrain the bolt from bodily swinging in the plane of the threads 9 to cut the threads, although this is not a serious problem unless great tightening pressure is applied.

As before stated, in the present invention critical longitudinal alignment of one member with the other is not necessary. Bolt 19 will always engage the portion of the thread opposite the selected bolt hole 7. By fabricating the respective channels, and particularly channel 6, by the extrusion process, the shapes are rapidly produced in substantially finished condition and at a relatively small cost. By provision for a bolt having a thread disposed on a cylindrical helical path the walls 8 are not wedged apart during the coupling of the channels. As the bolt apertures 7 have walls of substantial thickness, the bolts will be restrained from laterally swinging to cut or strip the threads 9.

I claim:

1. Mating channel-shaped members comprising a first member having longitudinally spaced bolt apertures and a second member having spaced parallel walls and continuous threads on said walls to be aligned in any mated position of said channel members with said bolt apertures, said second member being provided with transversely aligned wings on the walls and with extensions of said parallel walls extending beyond the junction of said wings with said walls, said first member having positioning flanges embracing said wall extensions to laterally brace the threads.

2. The device of claim 1 in combination with a bolt having a shank and a thread on the shank disposed on a cylindrical helical path.

3. The device of claim 2 wherein said second member with its continuous threads comprises an extruded shape.

4. In a thread coupling, the combination with a nut comprising spaced parallel walls having facing surfaces with continuous parallel threads on said surfaces, flanges extending outwardly from said walls, and ribs on said nut beyond the junction of said flanges with said walls, of a mating channel member having a bolt aperture, a bolt through said aperture, said bolt having threads engaged with the threads on said walls, and paired flanges extending from said channel and mutually spaced to laterally embrace the ribs on said nut.

5. The device of claim 4 in which said ribs comprise extensions of said walls, said ribs having facing threaded surfaces engaged by said bolt.

6. The device of claim 4 in which the paired flanges of said mating channel comprise inboard flanges, said channel being provided with paired outboard flanges laterally spaced from said inboard flanges, said inboard and outboard flanges having edge surfaces finished to a common plane substantially parallel to the outwardly extending flanges on the nut.

References Cited in the file of this patent

UNITED STATES PATENTS

| Number | Name | Date |
|---|---|---|
| 596,948 | Seely | Jan. 4, 1898 |
| 646,465 | Seely | Apr. 3, 1900 |
| 1,223,595 | McMillan et al. | Apr. 24, 1917 |
| 1,596,360 | Krey | Aug. 17, 1926 |
| 2,156,347 | McLaughlin | May 2, 1939 |
| 2,200,227 | Olson | May 7, 1940 |